United States Patent
Ogawa et al.

(10) Patent No.: US 9,362,575 B2
(45) Date of Patent: Jun. 7, 2016

(54) FUEL CELL MODULE

(75) Inventors: Tetsuya Ogawa, Wako (JP); Keiji Tsukamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 207 days.

(21) Appl. No.: 14/115,673

(22) PCT Filed: Apr. 12, 2012

(86) PCT No.: PCT/JP2012/060520
§ 371 (c)(1),
(2), (4) Date: Nov. 5, 2013

(87) PCT Pub. No.: WO2012/157395
PCT Pub. Date: Nov. 22, 2012

(65) Prior Publication Data
US 2014/0080021 A1 Mar. 20, 2014

(30) Foreign Application Priority Data
May 13, 2011 (JP) .................. 2011-108098

(51) Int. Cl.
*H01M 8/04* (2006.01)
*H01M 8/06* (2016.01)
*H01M 8/24* (2016.01)
*H01M 8/12* (2016.01)

(52) U.S. Cl.
CPC ........ *H01M 8/04022* (2013.01); *H01M 8/0612* (2013.01); *H01M 8/0618* (2013.01); *H01M 8/0631* (2013.01); *H01M 8/2425* (2013.01); *H01M 2008/1293* (2013.01); *Y02E 60/50* (2013.01); *Y02E 60/525* (2013.01)

(58) Field of Classification Search
None
See application file for complete search history.

(56) References Cited

U.S. PATENT DOCUMENTS

| | | |
|---|---|---|
| 5,527,632 A | 6/1996 | Gardner |
| 6,770,106 B1 | 8/2004 | Okamoto et al. |
| 8,679,689 B2 | 3/2014 | Ogawa et al. |
| 2005/0164051 A1 | 7/2005 | Venkataraman et al. |

(Continued)

FOREIGN PATENT DOCUMENTS

| | | |
|---|---|---|
| JP | H08-241722 | 9/1996 |
| JP | 2004-192958 | 7/2004 |

(Continued)

OTHER PUBLICATIONS

Machin translation of WO2007/077791 A1, printed Jul. 27, 2015.*

(Continued)

*Primary Examiner* — Maria J Laios
(74) *Attorney, Agent, or Firm* — Rankin, Hill & Clark LLP

(57) ABSTRACT

A fuel cell module includes a fuel cell stack, a partial oxidation reformer for reforming a mixed gas of a raw fuel and an oxygen-containing gas, an exhaust gas combustor for combusting a fuel exhaust gas and an oxygen-containing exhaust gas discharged from the fuel cell stack thereby to produce a combustion gas, and a heat exchanger for raising the temperature of the oxygen-containing gas by heat exchange with the combustion gas. The heat exchanger is provided on one side of the fuel cell stack, and the partial oxidation reformer and the exhaust gas combustor are provided on the other side of the fuel cell stack. The partial oxidation reformer is provided so as to surround the exhaust gas combustor.

4 Claims, 5 Drawing Sheets

(56) References Cited

U.S. PATENT DOCUMENTS

| | | |
|---|---|---|
| 2006/0147771 A1 | 7/2006 | Russell et al. |
| 2006/0251939 A1 | 11/2006 | Bandhauer et al. |
| 2006/0263658 A1 | 11/2006 | Yanagi et al. |
| 2008/0008646 A1 | 1/2008 | Kaye |
| 2008/0038601 A1 | 2/2008 | Kaye |
| 2009/0280364 A1 | 11/2009 | Tsunoda et al. |
| 2010/0324749 A1 | 12/2010 | Iwamoto et al. |

FOREIGN PATENT DOCUMENTS

| | | | | |
|---|---|---|---|---|
| JP | 2005-108805 | 4/2005 | | |
| JP | 2009-190913 | 8/2009 | | |
| JP | 2010-062134 | 3/2010 | | |
| JP | 2010-218888 | 9/2010 | | |
| WO | 01/47800 | 7/2001 | | |
| WO | 2007/077791 | 7/2007 | | |
| WO | WO2007/077791 A1 * | 7/2007 | | H01M 8/06 |
| WO | WO2010/016397 A1 * | 2/2010 | | H01M 8/24 |

OTHER PUBLICATIONS

This application is co-pending with U.S. Appl. No. 14/115,675, filed Nov. 5, 2013.

Japanese Office Action dated Aug. 5, 2014, Application No. 2011-108098; partial English translation included.

Japanese Office Action dated Aug. 5, 2014, Application No. 2011-108099; partial English translation included.

U.S. Office Action from co-pending U.S. Appl. No. 14/115,675, dated Sep. 14, 2015, 27 pages.

* cited by examiner

FUEL CELL MODULE

TECHNICAL FIELD

The present invention relates to a fuel cell module including a fuel cell stack formed by stacking a plurality of fuel cells for generating electricity by electrochemical reactions of a fuel gas and an oxygen-containing gas.

BACKGROUND ART

Typically, a solid oxide fuel cell (SOFC) employs a solid electrolyte of ion-conductive solid oxide such as stabilized zirconia. The electrolyte is interposed between an anode and a cathode to form an electrolyte electrode assembly (hereinafter also referred to as MEA). The electrolyte electrode assembly is interposed between separators (bipolar plates). In use, generally, predetermined numbers of the electrolyte electrode assemblies and the separators are stacked together to form a fuel cell stack.

Normally, a hydrogen gas produced from hydrocarbon based raw fuel by a reformer is used as a fuel gas supplied to the fuel cell. In the reformer, in general, a reformed gas (fuel gas) is produced, e.g., by applying partial oxidation reforming or steam reforming to such hydrocarbon based raw fuel, e.g., fossil fuel such as metal or LNG.

In this case, since the partial oxidation reformer induces exothermic reaction, the reaction can be started at relatively low temperature and operation can be started efficiently, and the follow up performance is good. In contrast, the steam reformer has good reforming efficiency.

For example, a fuel cell disclosed in Japanese Laid-Open Patent Publication No. 2010-218888 (hereinafter referred to as Conventional Technique 1) is known. In the fuel cell system, as shown in FIG. 4, a fuel processing system $1a$ is provided. The fuel processing system $1a$ has a reformer $2a$ and a burner combustor $3a$.

In the fuel cell system, an air supply apparatus $5a$ is controlled based on an indicator value of a flow rate meter $4a$. When the air is not supplied by the air supply apparatus $5a$, the indicator value of the flow rate meter $4a$ is corrected to a value indicating that the flow rate is zero. As a result, in the structure, since the indicator value of the flow rate meter $4a$ indicates the flow rate of the actual supplied air, the flow rate of the air supplied by the air supply apparatus $5a$ can be regulated with a high degree of accuracy.

Further, in a partial oxidation reformer disclosed in Japanese Laid-Open Patent Re-publication WO 01/047800 (PCT) (hereinafter referred to as Conventional Technique 2), as shown in FIG. 5, a reformer $1b$ has a dual wall structure including a housing $2b$, and partition walls $3b$, $3b$ provided in the housing $2b$. A reforming reaction unit $4b$ is provided between the partition walls $3b$, and a space between the housing $2b$ and the partition wall $3b$ is used as a raw material gas passage $5b$ around the reforming reaction unit $4b$.

Heat insulation of the reforming reaction unit $4b$ is performed by the raw material gas passage $5b$ to reduce non-uniformity in the temperature inside the reforming reaction unit $4b$. The raw material gas in the raw material gas passage $5b$ is heated beforehand by the reaction heat in the reforming reaction unit $4b$. Thus, the heat efficiency in the reformer $1b$ is improved by self-heat collection, and a preheater for heating the raw material gas beforehand is formed integrally between the raw material gas passage $5b$ and the reforming reaction unit $4b$.

According to the disclosure, in the structure, in the reforming reaction unit $4b$, in the case where a hydrogen rich reforming gas is produced by reaction including partial oxidation from the raw material gas, non-uniformity in the temperature inside the reforming reaction unit $4b$ is reduced, improvement in the heat efficiency is achieved, and the reformer has a simple and compact structure.

SUMMARY OF INVENTION

However, in Conventional Technique 1, the flow rate of the fluid is corrected, and correction based on the temperature is not considered. Thus, if the volume varies depending on the temperature range, the supplied fluid may exceed the fluid control range undesirably. Further, in Conventional Technique 1, since a solid polymer electrolyte fuel cell stack is used, it is required to cool reformed gas discharged from the reformer $2a$. Therefore, a large loss in heat energy occurs, which results in a problem that the heat energy cannot be utilized efficiently.

Further, in Conventional Technique 2, since heat exchange occurs between the raw material gas and the reformed gas, the temperature of the reformed gas is decreased. Further, since the reformer for solid polymer electrolyte fuel cells is adopted, it is required to decrease the temperature of the reformed gas when the reformed gas is transferred to a CO removal device, and the heat energy cannot be utilized efficiently.

The present invention has been made to solve the problems of this type, and an object of the present invention is to provide a fuel cell module which makes it possible to suppress loss of heat energy, facilitate thermally self-sustaining operation, and achieve reduction in the cost and size.

The present invention relates to a fuel cell module including a fuel cell stack formed by stacking a plurality of fuel cells in a stacking direction for generating electricity by electrochemical reactions of a fuel gas and an oxygen-containing gas, a partial oxidation reformer for reforming a mixed gas of a raw fuel chiefly containing hydrocarbon and an oxygen-containing gas thereby to produce the fuel gas, and supplying the fuel gas to the fuel cell stack, an exhaust gas combustor for combusting the fuel gas discharged from the fuel cell stack as a fuel exhaust gas and the oxygen-containing gas discharged from the fuel cell stack as an oxygen-containing exhaust gas thereby to produce a combustion gas, and a heat exchanger for raising the temperature of the oxygen-containing gas by heat exchange with the combustion gas, and supplying the oxygen-containing gas to the fuel cell stack.

The heat exchanger is provided on one side of the fuel cell stack, and the partial oxidation reformer and the exhaust gas combustor are provided on the other side of the fuel cell stack. The partial oxidation reformer is provided so as to surround the exhaust gas combustor.

In the present invention, the heat exchanger is provided on one side of the fuel cell stack, and the partial oxidation reformer and the exhaust gas combustor are provided on the other side of the fuel cell stack. Thus, heat release from the fuel cell stack is minimized, and variation in the temperature distribution in the fuel cell stack is reduced. Accordingly, the heat energy loss can be suppressed, and thermally self-sustaining operation is facilitated easily.

Further, the partial oxidation reformer is provided so as to surround the exhaust gas combustor. In the structure, in the state where the self-ignition temperature is maintained, the fuel exhaust gas and the oxygen-containing exhaust gas discharged from the fuel cell stack can be supplied into the exhaust gas combustor. Accordingly, in the exhaust gas combustor, stability in combustion is improved suitably, and thermally self-sustaining operation is facilitated easily.

Moreover, as a reformer, only the partial oxidation reformer is provided without requiring any steam reformer. Thus, since the water supply system for supplying water vapor can be omitted, reduction in the number of parts can be achieved, and reduction in the cost and size of the entire fuel cell module is achieved.

The above and other objects, features, and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
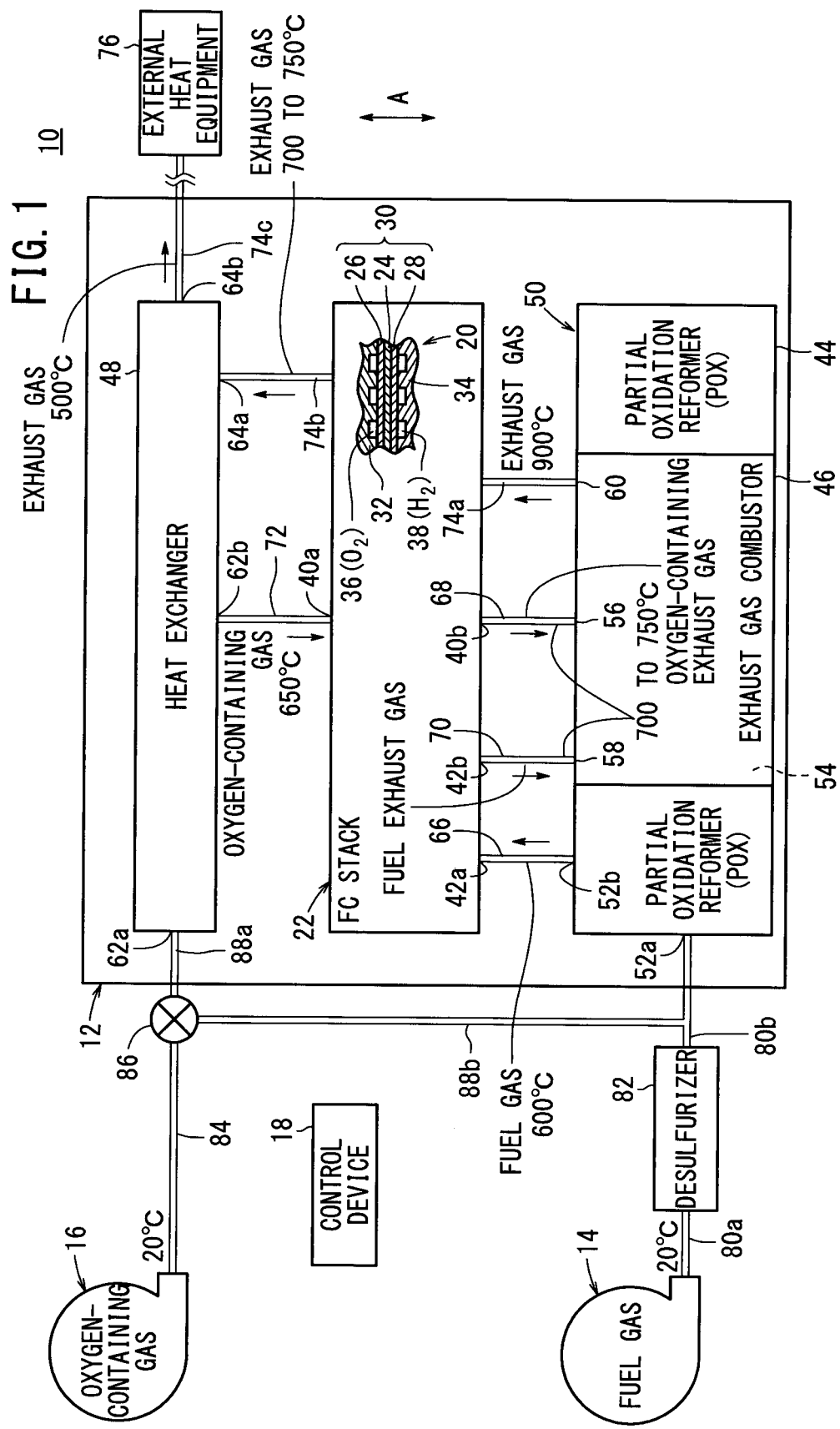
FIG. 1 is a diagram schematically showing a structure of a fuel cell system incorporating a fuel cell module according to an embodiment of the present invention.

As shown in FIG. 1, a fuel cell system 10 incorporates a fuel cell module 12 according to an embodiment of the present invention, and the fuel cell system 10 is used in various applications, including stationary and mobile applications. For example, the fuel cell system 10 is mounted on a vehicle.

The fuel cell system 10 includes a fuel cell module (SOFC module) 12 for generating electrical energy in power generation by electrochemical reactions of a fuel gas (a gas produced by mixing a hydrogen gas, methane, and carbon monoxide) and an oxygen-containing gas (air), a raw fuel supply apparatus (including a fuel gas pump) 14 for supplying a raw fuel (e.g., city gas) to the fuel cell module 12, an oxygen-containing gas supply apparatus (including an air pump) 16 for supplying the oxygen-containing gas to the fuel cell module 12, and a control device 18 for controlling the amount of electrical energy generated in the fuel cell module 12.

The fuel cell module 12 includes a fuel cell stack 22 formed by stacking a plurality of solid oxide fuel cells 20 in a vertical direction (indicated by arrow A). For example, the fuel cell 20 includes an electrolyte electrode assembly 30 (MEA). The electrolyte electrode assembly 30 includes a cathode 26, an anode 28, and an electrolyte 24 interposed between the cathode 26 and the anode 28. For example, the electrolyte 24 is made of ion-conductive solid oxide such as stabilized zirconia.

A cathode side separator 32 and an anode side separator 34 are provided on both sides of the electrolyte electrode assembly 30. An oxygen-containing gas flow field 36 for supplying an oxygen-containing gas to the cathode 26 is formed in the cathode side separator 32, and a fuel gas flow field 38 for supplying a fuel gas to the anode 28 is formed in the anode side separator 34. As the fuel cell 20, various types of conventional SOFC can be adopted.

An oxygen-containing gas supply passage 40a, an oxygen-containing gas discharge passage 40b, a fuel gas supply passage (fuel gas inlet) 42a, and a fuel gas discharge passage 42b extend through the fuel cell stack 22. The oxygen-containing gas supply passage 40a is connected to an inlet of each oxygen-containing gas flow field 36, the oxygen-containing gas discharge passage 40b is connected to an outlet of each oxygen-containing gas flow field 36, the fuel gas supply passage 42a is connected to an inlet of each fuel gas flow field 38, and the fuel gas discharge passage 42b is connected to an outlet of each fuel gas flow field 38.

The fuel cell module 12 includes a partial oxidation reformer (POX) 44 for reforming a mixed gas of a raw fuel chiefly containing hydrocarbon and the oxygen-containing gas, an exhaust gas combustor 46 for combusting the fuel gas discharged from the fuel cell stack 22 as a fuel exhaust gas, and the oxygen-containing gas discharged from the fuel cell stack 22 as an oxygen-containing exhaust gas thereby to produce a combustion gas, and a heat exchanger 48 for raising the temperature of the oxygen-containing gas by heat exchange with the combustion gas, and supplying the oxygen-containing gas to the fuel cell stack 22.

Basically, the fuel cell module 12 is made up of the fuel cell stack 22 and FC (fuel cell) peripheral equipment 50. The FC peripheral equipment 50 includes the partial oxidation reformer 44, the exhaust gas combustor 46, and the heat exchanger 48. The partial oxidation reformer 44 is provided around the exhaust gas combustor 46. The exhaust gas combustor 46 has a columnar (or square pillar) outer shape. The partial oxidation reformer 44 has a ring shape (or square pillar shape) containing therein the exhaust gas combustor 46.

The heat exchanger 48 is provided on one side of the fuel cell stack 22, more preferably, on one side of the fuel cells 20 in the stacking direction indicated by the arrow A, and the partial oxidation reformer 44 and the exhaust gas combustor 46 are provided on the other side of the fuel cell stack 22, more preferably, on the other side of the fuel cells 20 in the stacking direction indicated by the arrow A.

The direction in which the fuel cells 20 are stacked is the same as the direction of gravity. Stated otherwise, the heat exchanger 48 is provided above the fuel cell stack 22 in the direction of gravity, and the partial oxidation reformer 44 and the exhaust gas combustor 46 are provided below the fuel cell stack 22 in the direction of gravity.

The partial oxidation reformer 44 is filled with partial oxidation catalyst (not shown). An ignition device (not shown) such as an igniter or a glow for ignition at the time of starting operation is provided on the partial oxidation reformer 44. The partial oxidation reformer 44 has a mixed gas inlet port 52a and a fuel gas outlet port 52b. A raw fuel after desulfurization is supplied into the partial oxidation reformer 44 through the mixed gas inlet port 52a, and the reformed gas (fuel gas) after partial oxidation reforming of the raw fuel is discharged from the partial oxidation reformer 44 through the fuel gas outlet port 52b.

A combustion chamber 54 is provided in the exhaust gas combustor 46. An oxygen-containing exhaust gas inlet port 56, a fuel exhaust gas inlet port 58, and an exhaust gas outlet port 60 are connected to the combustion chamber 54. At the combustion chamber 54, an ignition device (not shown) such as an igniter or a glow for ignition of the mixed gas of the reduction gas (fuel gas) and the oxygen-containing gas at the time of starting operation is provided.

A heating space containing a plurality of oxygen-containing gas pipes (not shown) is formed in the heat exchanger 48, and the oxygen-containing gas flowing through the oxygen-containing gas pipes is heated by the hot exhaust gas (combustion gas) supplied to the heating space. The heat exchanger 48 has an oxygen-containing gas supply port 62a and an oxygen-containing gas discharge port 62b connected respectively to the inlets and the outlets of the oxygen-containing gas pipes, and an exhaust gas supply port 64a and an exhaust gas discharge port 64b connected to the heating space.

The fuel gas supply passage 42a of the fuel cell stack 22 and the fuel gas outlet port 52b of the partial oxidation reformer 44 are connected to each other through a fuel gas channel 66. The oxygen-containing gas discharge passage 40b of the fuel cell stack 22 and the oxygen-containing exhaust gas inlet port 56 of the exhaust gas combustor 46 are connected to each other through an oxygen-containing exhaust gas channel 68. The fuel gas discharge passage 42b of the fuel cell stack 22 and the fuel exhaust gas inlet port 58 of the exhaust gas combustor 46 are connected to each other through a fuel exhaust gas channel 70. The oxygen-containing gas supply passage 40a of the fuel cell stack 22 and the oxygen-containing gas discharge port 62b of the heat exchanger 48 are connected to each other through an oxygen-containing gas channel 72.

One end of a combustion gas pipe 74a is connected to the exhaust gas outlet port 60 of the exhaust gas combustor 46, and the other end of the combustion gas pipe 74a is connected to the fuel cell stack 22. One end of a combustion gas pipe 74b for discharging the exhaust gas (combustion gas) is connected to the fuel cell stack 22, and the other end of the combustion gas pipe 74b is connected to the exhaust gas supply port 64a of the heat exchanger 48. One end of a combustion gas pipe 74c is connected to the exhaust gas discharge port 64b of the heat exchanger 48, and the other end of the combustion gas pipe 74c is connected to external heat equipment 76. For example, the external heat equipment 76 includes a water heater or a thermoelectric converter.

The raw fuel supply apparatus 14 has a raw fuel channel 80a, and the raw fuel channel 80a is connected to an inlet of a desulfurizer 82 for removing sulfur compounds in the city gas (raw fuel). One end of a raw fuel supply channel 80b is connected to the outlet of the desulfurizer 82, and the other end of the raw fuel supply channel 80b is connected to the mixed gas inlet port 52a of the partial oxidation reformer 44.

The oxygen-containing gas supply apparatus 16 has an oxygen-containing gas supply channel 84, and the oxygen-containing gas supply channel 84 is connected to an oxygen-containing gas regulator valve 86. The oxygen-containing gas regulator valve 86 distributes the oxygen-containing gas to a first oxygen-containing gas supply channel 88a and a second oxygen-containing gas supply channel 88b. The first oxygen-containing gas supply channel 88a is connected to the oxygen-containing gas supply port 62a of the heat exchanger 48, and the second oxygen-containing gas supply channel 88b is connected to the raw fuel supply channel 80b, at a position between the desulfurizer 82 and the partial oxidation reformer 44.

The partial oxidation reformer 44 is a preliminary reformer for partially oxidation-reforming higher hydrocarbon ($C_{2+}$) such as ethane ($C_2H_6$), propane ($C_3H_8$), and butane ($C_4H_{10}$) in the city gas (raw fuel) thereby to produce the fuel gas chiefly containing hydrogen, and CO. The operating temperature of the partial oxidation reformer 44 is several hundred ° C.

The fuel cell 20 operates at high temperature, such as several hundred ° C. Hydrogen and CO contained in the fuel gas are supplied to a portion of the electrolyte 24 that is positioned adjacent to the anode 28.

Figure 2:
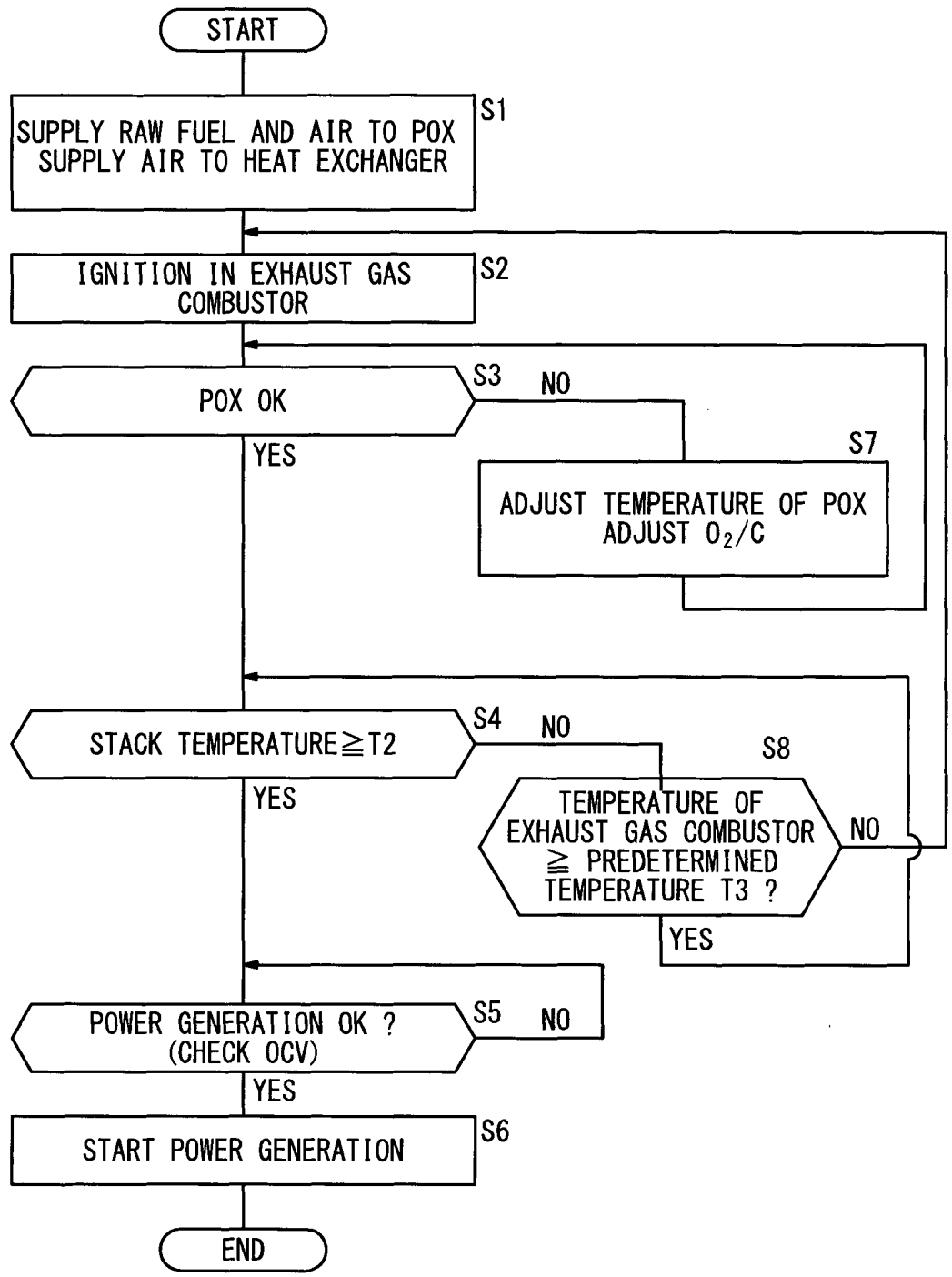
FIG. 2 is a flow chart illustrating an operational sequence of the fuel cell system.

Next, operation of the fuel cell system 10 will be described below with reference to a flow chart shown in FIG. 2.

Firstly, at the time of starting operation of the fuel cell system 10, the opening degree of the oxygen-containing gas regulator valve 86 is determined. More specifically, the raw fuel supply apparatus 14 is operated, and the opening degree of the oxygen-containing gas regulator valve 86 is adjusted such that the air (oxygen-containing gas) and the raw fuel such as city gas (containing $CH_4$, $C_2H_6$, $C_3H_8$, $C_4H_{10}$) required for partial oxidation reforming are supplied (step S1). The control of the partial oxidation reforming is performed based on the air fuel ratio ($O_2/C$) (the number of moles of oxygen in the supplied air/the number of moles 25, of carbon in the supplied raw fuel). The air and raw fuel are supplied to the partial oxidation reformer 44 at the optimum air-fuel ratio.

In the raw fuel supply apparatus 14, the raw fuel supplied to the raw fuel channel 80a is desulfurized by the desulfurizer 82, and then the raw fuel is supplied to the mixed gas inlet port 52a of the partial oxidation reformer 44 through the raw fuel supply channel 80b. In the oxygen-containing gas supply apparatus 16, after the air is supplied to the oxygen-containing gas supply channel 84, the air is distributed to the first oxygen-containing gas supply channel 88a and to the second oxygen-containing gas supply channel 88b at their respective predetermined amounts through the oxygen-containing gas regulator valve 86. The air distributed to the second oxygen-containing gas supply channel 88b is mixed with the raw fuel in the raw fuel supply channel 80b, and the mixture containing the air is supplied to the mixed gas inlet port 52a of the partial oxidation reformer 44.

In the partial oxidation reformer 44, ignition is caused by an unillustrated ignition device, and then partial oxidation reforming by the partial oxidation reformer 44 is started. For example, if $O_2/C=0.5$, partial oxidation reaction ($2CH_4+O_2 \rightarrow 4H_2+2CO$) occurs. The partial oxidation reaction is an exothermic reaction, and a hot reduction gas (fuel gas) (at about 600° C.) is produced by the partial oxidation reformer 44.

The hot reduction gas is supplied to the fuel gas supply passage 42a of the fuel cell stack 22 through the fuel gas channel 66. In the fuel cell stack 22, after the hot reduction gas flows through the fuel gas flow field 38, the fuel gas is discharged from the fuel gas discharge passage 42b to the fuel exhaust gas channel 70. The reduction gas is introduced from the fuel exhaust gas inlet port 58 communicating with the fuel exhaust gas channel 70, into the combustion chamber 54 of the exhaust gas combustor 46.

On the other hand, in the oxygen-containing gas supply apparatus 16, the air is supplied to the first oxygen-containing gas supply channel 88a, and then is introduced from the oxygen-containing gas supply port 62a into the heat exchanger 48. The air is heated by the combustion gas (to be described later) supplied into the heating space (heat exchange between the air and the combustion gas occurs) while the air is moving through the oxygen-containing gas pipes. The heated air is supplied through the oxygen-containing gas channel 72 to the oxygen-containing gas supply passage 40a of the fuel cell stack 22.

In the fuel cell stack 22, after the heated air flows through the oxygen-containing gas flow field 36, the air is discharged from the oxygen-containing gas discharge passage 40b into the oxygen-containing exhaust gas channel 68. Since the oxygen-containing exhaust gas channel 68 is opened to the combustion chamber 54 of the exhaust gas combustor 46, the air is supplied into the combustion chamber 54. Therefore, the fuel exhaust gas and the oxygen-containing exhaust gas flow into the combustion chamber 54. When the temperature in the combustion chamber 54 exceeds the self-ignition temperature of the fuel gas, combustion by the air and the fuel gas is started in the combustion chamber 54. If the temperature in the combustion chamber 54 does not exceed the self-ignition temperature, ignition is caused by an ignition device (not shown) (step S2).

The combustion gas produced in the combustion chamber 54 flows from the exhaust gas outlet port 60, and the combustion gas is supplied to the fuel cell stack 22 through the combustion gas pipe 74a to raise the temperature of the fuel cell stack 22. Further, the combustion gas flows through the combustion gas pipe 74b into the exhaust gas supply port 64a of the heat exchanger 48.

Thus, the combustion gas is supplied into the heating space in the heat exchanger 48, and heats the oxygen-containing gas flowing through the oxygen-containing gas pipes. Then, the combustion gas flows from the exhaust gas discharge port 64b through the combustion gas pipe 74c into the external heat equipment 76.

As described above, since the heated air, the heated fuel gas, and the combustion gas flow through the fuel cell stack 22, the temperature of the fuel cell stack 22 is increased. In the meanwhile, the partial oxidation reformer 44 is heated by the exhaust gas combustor 46. It is determined whether or not the partial oxidation reformer 44 is in a predetermined state where operation of the fuel cell stack 22 can be performed (step S3).

Figure 3:
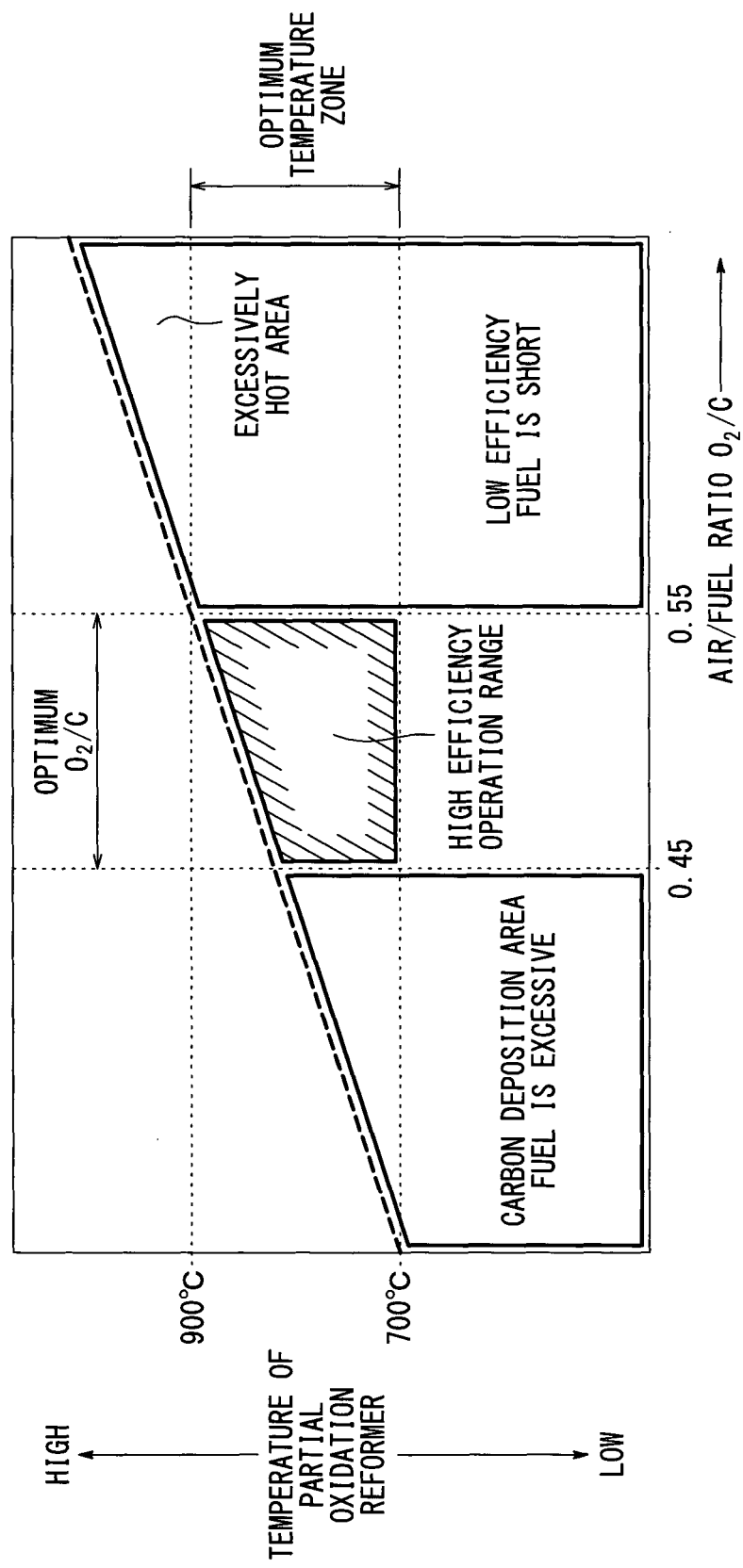
FIG. 3 is a diagram showing an optimal map of a partial oxidation reformer of the fuel cell module.
Figure 4:
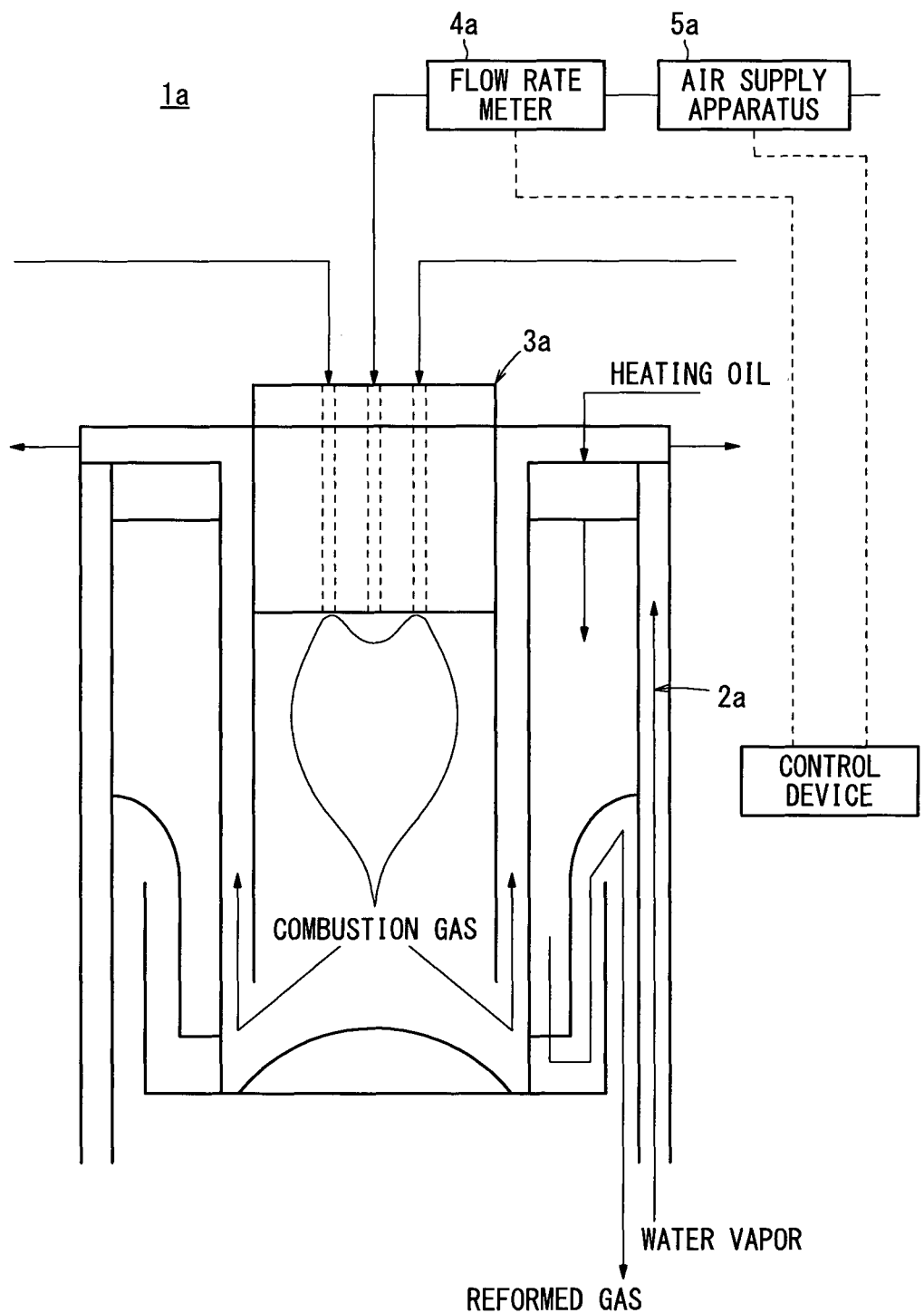
FIG. 4 is a view schematically showing a fuel cell system disclosed in Conventional Technique 1.
Figure 5:
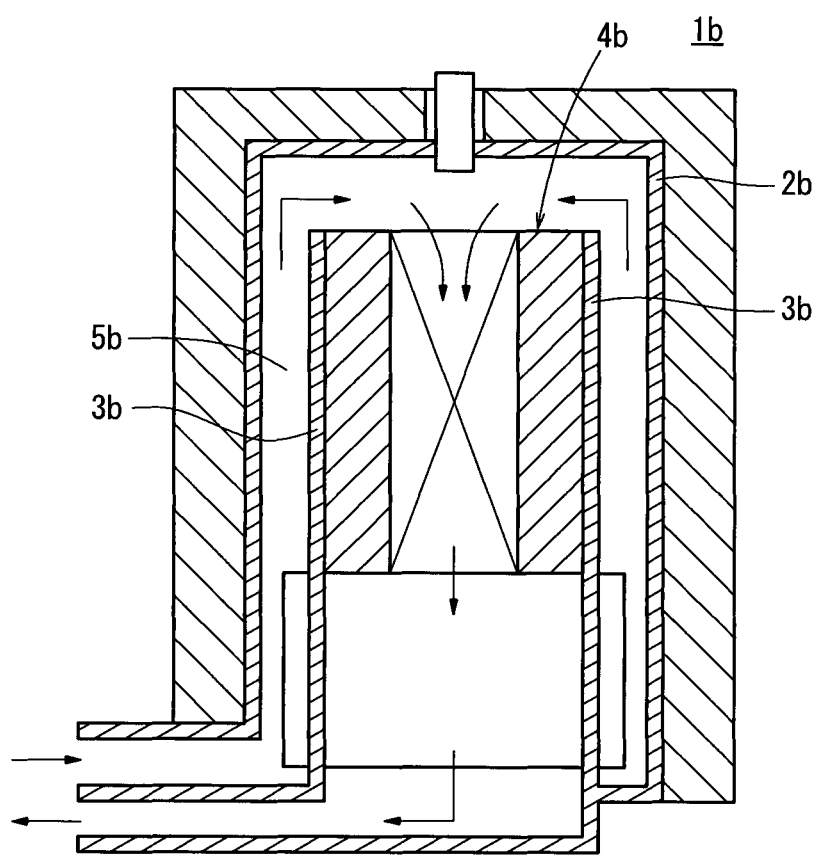
FIG. 5 is a view schematically showing a partial oxidation reformer disclosed in Conventional Technique 2.

More specifically, as shown in FIG. 3, a high efficiency operation range where highly efficient reaction occurs is determined as a map based on the temperature and the air/fuel ratio of the partial oxidation reformer 44. In the case where the temperature T1 of the partial oxidation reformer 44 is in the range of 700° C.$\leq$T1$\leq$900° C., and the air/fuel ratio is in the range of 0.45$\leq$O$_2$/C$\leq$0.55, it is determined that the reforming state of the partial oxidation reformer 44 is OK.

If it is determined that the reforming state of the partial oxidation reformer 44 is OK (YES in step S3), the process proceeds to step S4. In step S4, it is determined whether or not the temperature of the fuel cell stack 22 (stack temperature) is T2 (e.g., 650° C.) or more. If it is determined that the stack temperature is T2 or more (YES in step S4), the process proceeds to step S5.

In step S5, it is determined whether or not the fuel cell stack 22 is ready for power generation. More specifically, OCV (open-circuit voltage) of the fuel cell 20 is measured, and if the OCV reaches a predetermined value, then it is determined that the fuel cell stack 22 is ready for power generation (YES in step S5). Thus, power generation is started in the fuel cell stack 22 (step S6).

During power generation of the fuel cell stack 22, in the same manner as in the case of the start-up operation, the air flows through the oxygen-containing gas flow field 36, and the fuel gas flows through the fuel gas flow field 38. Therefore, the air is supplied to the cathode 26 of each fuel cell 20, and the fuel gas is supplied to the anode 28 of each fuel cell 20 to induce chemical reactions at the cathode 26 and the anode 28 for generating electricity.

The air consumed in the reaction (containing unconsumed air) is discharged as an oxygen-containing exhaust gas to the oxygen-containing exhaust gas channel 68. Further, the fuel gas consumed in the reaction (containing unconsumed fuel gas) is discharged as the fuel exhaust gas to the fuel exhaust gas channel 70. The oxygen-containing exhaust gas and the fuel exhaust gas are supplied to the exhaust gas combustor 46, and consumed in combustion in the exhaust gas combustor 46. When the temperature of the fuel gas exceeds the self-ignition temperature of the fuel gas, combustion of the air and the fuel gas is started in the combustion chamber 54.

In step S3, if it is determined that the reforming state of the partial oxidation reformer 44 is NG (NO in step S3), the process proceeds to step S7. In step S7, the temperature of the partial oxidation reformer 44 is adjusted, and the raw fuel and the air (O$_2$/C) supplied to the partial oxidation reformer 44 is adjusted.

Further, in step S4, if it is determined that the stack temperature is less than T2 (NO in step S4), the process proceeds to step S8. In step S8, it is determined whether the temperature of the exhaust gas combustor 46 is a predetermine temperature T3 (e.g., 900° C.) or more. If it is determined that the temperature of the exhaust gas combustor 46 is the predetermined temperature T3 or more (YES in step S8), the process returns to step S4. If it is determined that the temperature of the exhaust gas combustor 46 is less than the predetermined temperature T3 (NO in step S8), the process returns to step S2.

In the embodiment of the present invention, the heat exchanger 48 is provided on one side of the fuel cell stack 22, and the partial oxidation reformer 44 and the exhaust gas combustor 46 are provided on the other side of the fuel cell stack 22. Thus, heat radiation from the fuel cell stack 22 is minimized, and variation in the temperature distribution in the fuel cell stack 22 is reduced. Accordingly, the heat energy loss can be suppressed, and thermally self-sustaining operation is facilitated easily. The thermally self-sustaining operation herein means operation where the operating temperature of the fuel cell can be maintained only using the heat generated by the fuel cell itself, without requiring any heat supplied from the outside.

Further, the partial oxidation reformer 44 is provided so as to surround the exhaust gas combustor 46. In the structure, in the state where the self-ignition temperature is maintained, the fuel exhaust gas and the oxygen-containing exhaust gas discharged from the fuel cell stack 22 can be supplied into the exhaust gas combustor 46. Accordingly, in the exhaust gas combustor 46, stability in combustion is improved suitably, and thermally self-sustaining operation is facilitated easily.

Moreover, as a reformer, only the partial oxidation reformer 44 is provided without requiring any steam reformer. Thus, since the water supply system for supplying water vapor can be omitted, reduction in the number of parts can be achieved, and reduction in the cost and size of the entire fuel cell module 12 is achieved.

Further, the heat exchanger 48 is provided at one side of the fuel cell stack 22 in the stacking direction indicated by the arrow A, and the partial oxidation reformer 44 and the exhaust gas combustor 46 are provided on the other side of the fuel cell stack 22 in the stacking direction. Thus, variation of the temperature distribution in the stacking direction of the fuel cell stack 22 can be reduced, loss of the heat energy can be suppressed, and thermally self-sustaining operation can be facilitated easily.

The heat exchanger 48 is provided above the fuel cell stack 22 in the direction of gravity, and the partial oxidation reformer 44 and the exhaust gas combustor 46 are provided below the fuel cell stack 22 in the direction of gravity. Thus, firstly, heat energy produced in the partial oxidation reformer 44 and the exhaust gas combustor 46 is utilized for raising and maintaining the temperature of the fuel cell stack 22. Thereafter, the heat energy produced in the fuel cell stack 22 is used for raising the temperature of the oxygen-containing gas in the heat exchanger 48. Thus, heat release from the entire fuel cell module 12 is suppressed as much as possible, loss of the heat energy can be suppressed, and thermally self-sustaining operation can be facilitated easily.

Further, the combustion gas pipes 74a, 74b, and 74c are provided for supplying the combustion gas discharged from the exhaust gas combustor 46 to the fuel cell stack 22, the heat exchanger 48, and the external heat equipment 76 successively. In the structure, firstly, the heat energy produced in the partial oxidation reformer 44 and the exhaust gas combustor 46 is used for raising and maintaining the temperature of the fuel cell stack 22. Thereafter, the heat energy produced in the fuel cell stack 22 is used for raising the temperature of the oxygen-containing gas in the heat exchanger 48. Further, the heat energy can be supplied to the external heat equipment 76 such as a water heater or a thermoelectric converter by the exhaust gas discharged from the heat exchanger 48. Thus, heat release from the fuel cell module 12 can be minimized as a whole. Loss of heat energy can be suppressed, and thermally self-sustaining operation can be facilitated easily.

Further, the fuel cell module 12 is a solid oxide fuel cell module. Therefore, the fuel cell module 12 is applicable to high temperature type fuel cells such as SOFC.

Although certain preferred embodiments of the present invention have been shown and described in detail, it should be understood that various changes and modifications may be made therein without departing from the scope of the appended claims.

The invention claimed is:

1. A fuel cell module comprising:
   a fuel cell stack formed by stacking a plurality of fuel cells in a stacking direction for generating electricity by electrochemical reactions of a fuel gas and an oxygen-containing gas;
   a partial oxidation reformer for reforming a mixed gas of a raw fuel chiefly containing hydrocarbon and an oxygen-containing gas thereby to produce the fuel gas, and supplying the fuel gas to the fuel cell stack;
   an exhaust gas combustor for combusting the fuel gas discharged from the fuel cell stack as a fuel exhaust gas and the oxygen-containing gas discharged from the fuel cell stack as an oxygen-containing exhaust gas thereby to produce a combustion gas; and
   a heat exchanger for raising the temperature of the oxygen-containing gas by heat exchange with the combustion gas, and supplying the oxygen-containing gas to the fuel cell stack,
   wherein the heat exchanger is provided on one side of the fuel cell stack, and the partial oxidation reformer, which is alone provided as a reformer in the fuel cell module, and the exhaust gas combustor are provided on the other side of the fuel cell stack;
   the partial oxidation reformer is provided so as to surround the exhaust gas combustor, and
   a combustion gas pipe is provided for supplying the combustion gas discharged from the exhaust gas combustor to the fuel cell stack, the heat exchanger, and external heat equipment successively.

2. The fuel cell module according to claim 1, wherein the heat exchanger is provided on one side of the fuel cell stack in the stacking direction; and
   the partial oxidation reformer and the exhaust gas combustor are provided on the other side of the fuel cell stack in the stacking direction.

3. The fuel cell module according to claim 2, wherein the heat exchanger is provided above the fuel cell stack in the direction of gravity; and
   the partial oxidation reformer and the exhaust gas combustor are provided below the fuel cell stack in the direction of gravity.

4. The fuel cell module according to claim 1, wherein the fuel cell module is a solid oxide fuel cell module.

* * * * *